United States Patent [19]
Fournier et al.

[11] 4,114,638
[45] Sep. 19, 1978

[54] SAFETY CONNECTION DEVICE FOR INTERCONNECTING TWO PIPING ELEMENTS

[75] Inventors: Pierre Fournier, Noisy le Sec; André Jules Legleye, Vernouillet; Pierre Collé, Ozoir la Ferriere; Claude Michaut, Mennecy, all of France; Boris Petrovich Timofeev, Moscow, U.S.S.R.; Adolf Moritsovich Alexandrov, Moscow, U.S.S.R.; Ruben Dzhangirovich Balaian, Moscow, U.S.S.R.; Leonid Ozerovich Patik, Moscow, U.S.S.R.; Victor Leontjevich Berezovsky, Moscow, U.S.S.R.; Leonid Arkadjevich Matzkin, Moscow, U.S.S.R.

[73] Assignees: Compagnie des Terminaux Marins Coterm, Paris, France; Spetsialnoe Konstruktorskoe Bjuro "Transnefteavtomatika", Moscow, U.S.S.R.

[21] Appl. No.: 609,903

[22] Filed: Sep. 3, 1975

[30] Foreign Application Priority Data

Sep. 3, 1974 [FR] France ................. 74 29915

[51] Int. Cl.² .................. F16L 29/00; F16L 37/28
[52] U.S. Cl. ......................... 137/242; 137/268; 137/798; 251/149.1
[58] Field of Search ............. 137/614.06, 268, 614.01, 137/614.02, 614.03, 614.04, 614.05, 798, 242; 251/149.9, 149.4, 149.5, 149.6, 149.7; 285/18, 325, 326, DIG. 21; 141/348, 349, 350, 351, 360, 361

[56] References Cited

U.S. PATENT DOCUMENTS

| 2,696,993 | 12/1954 | Buckler | 137/614.06 |
|---|---|---|---|
| 2,778,391 | 1/1957 | Muller | 141/349 |
| 2,904,351 | 9/1959 | Gellett et al. | 251/149.9 X |
| 3,475,001 | 10/1969 | Hieber | 137/614.06 X |
| 3,580,539 | 5/1971 | Van Scoy | 137/268 X |
| 3,675,713 | 7/1972 | Watkins | 285/18 X |
| 3,889,708 | 6/1975 | Chronister | 137/268 |
| 3,897,091 | 7/1975 | McMath et al. | 137/614.06 X |

FOREIGN PATENT DOCUMENTS

| 1,220,364 | 1/1960 | France | 137/614.06 |
|---|---|---|---|
| 854,763 | 11/1960 | United Kingdom | 285/DIG. 21 |

*Primary Examiner*—William R. Cline
*Attorney, Agent, or Firm*—Kenyon & Kenyon, Reilly, Carr & Chapin

[57] ABSTRACT

A safety device for coupling one end of a main conduit of a first piping element coaxially to one end of a second piping element. The first piping element has a branch conduit adjacent to the one end of the main conduit, and the device includes an obdurating member inside the main conduit of the first piping element, an operating mechanism connected to the obdurating member and extending from the other end of the main conduit for moving the obdurating member between a first position and a second position to selectively open and close the passage between the one end of the main conduit and the branch conduit, clamping apparatus mounted on the second piping element for clamping the two elements together, and an actuator mounted externally on the second piping element for engagement with the operating mechanism when the two elements are coupled together to move the mechanism between the first and second positions. The obdurating member preferably has a recess facing the one end of the main conduit for housing a ball. Supply and exhaust conduits extend into the recess from the other end of the main conduit so that fluid can be supplied under pressure to drive the ball through the passageway of the second piping element and then can be exhausted to return the ball to the recess, thereby cleaning out the second piping element.

16 Claims, 7 Drawing Figures

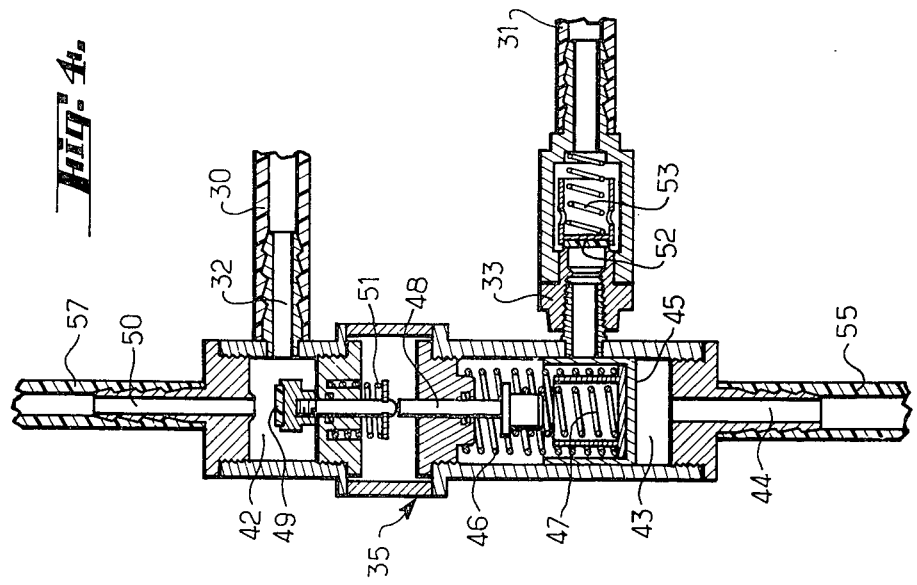
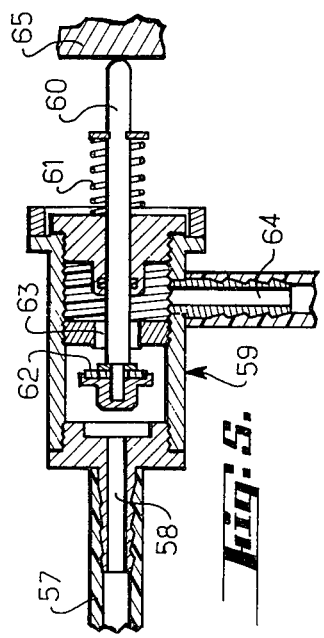
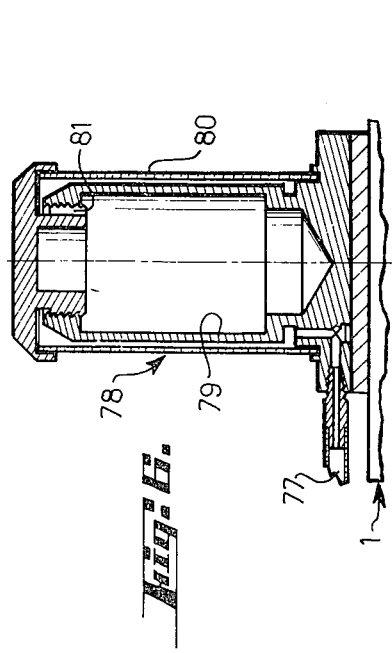
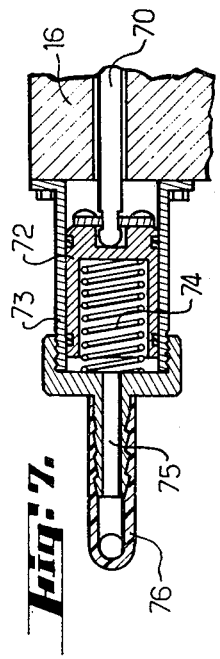

SAFETY CONNECTION DEVICE FOR INTERCONNECTING TWO PIPING ELEMENTS

BACKGROUND OF THE INVENTION

The present invention relates generally to a safety connection device for interconnecting two piping elements and particularly for sealingly assembling together two piping elements, one of which preferably is movable, so that the movable piping element can be successively connected to various other stationary piping elements, in order to load or unload different materials.

Such a safety device comprises means for sealingly assembling the piping elements by aligning them end to end and sealingly engaging their connecting flanges on one another, and obdurating means controlled for selectively opening or closing one of the piping elements. The obdurating means must allow quick automatic or semiautomatic assembly of the piping elements together while at the same time permitting the connection of the movable element to any one of the stationary elements.

SUMMARY OF THE INVENTION

According to the invention, a safety connection device of this type is characterized in that the obdurating means are mounted on the first piping element (preferably the stationary element), whereas the means for sealingly assembling the piping elements and the means for controlling the obdurating means are mounted on the second (preferably the movable element) element.

In this way, it is the movable element that ensures the tight application and the sealed assembly of the two elements, as well as the control of the obdurating means.

According to other features of the invention, the piston forming the said obdurating means is in the shape of a semi-spherical cup, the concavity of which faces the flange of the first element and which is intended to receive and support a ball or the like, the diameter of which is substantially equal to the inner diameter of the piping elements and which is intended to serve as a means for cleaning the internal surface of the said piping elements.

It is thus possible to ensure a cleaning of the piping elements before disconnecting the movable element and re-connecting it to another stationary element in order to load or unload another material, using a structure already provided in the device, i.e. the obdurating means.

BRIEF DESCRIPTION OF THE DRAWINGS

The invention will appear more clearly from the following description of the drawings illustrating one embodiment of the invention and wherein:

FIG. 4 is a sectional view in the plane of line IV—IV of FIG. 1;

FIG. 5 is a sectional view of a limit valve mounted on the element of FIG. 1;

FIG. 6 is an enlarged sectional view of the encircled portion VI of FIG. 1;

FIG. 7 is a sectional view of the encircled portion VII of FIG. 1.

DESCRIPTION OF THE PREFERRED EMBODIMENT

Figure 1:
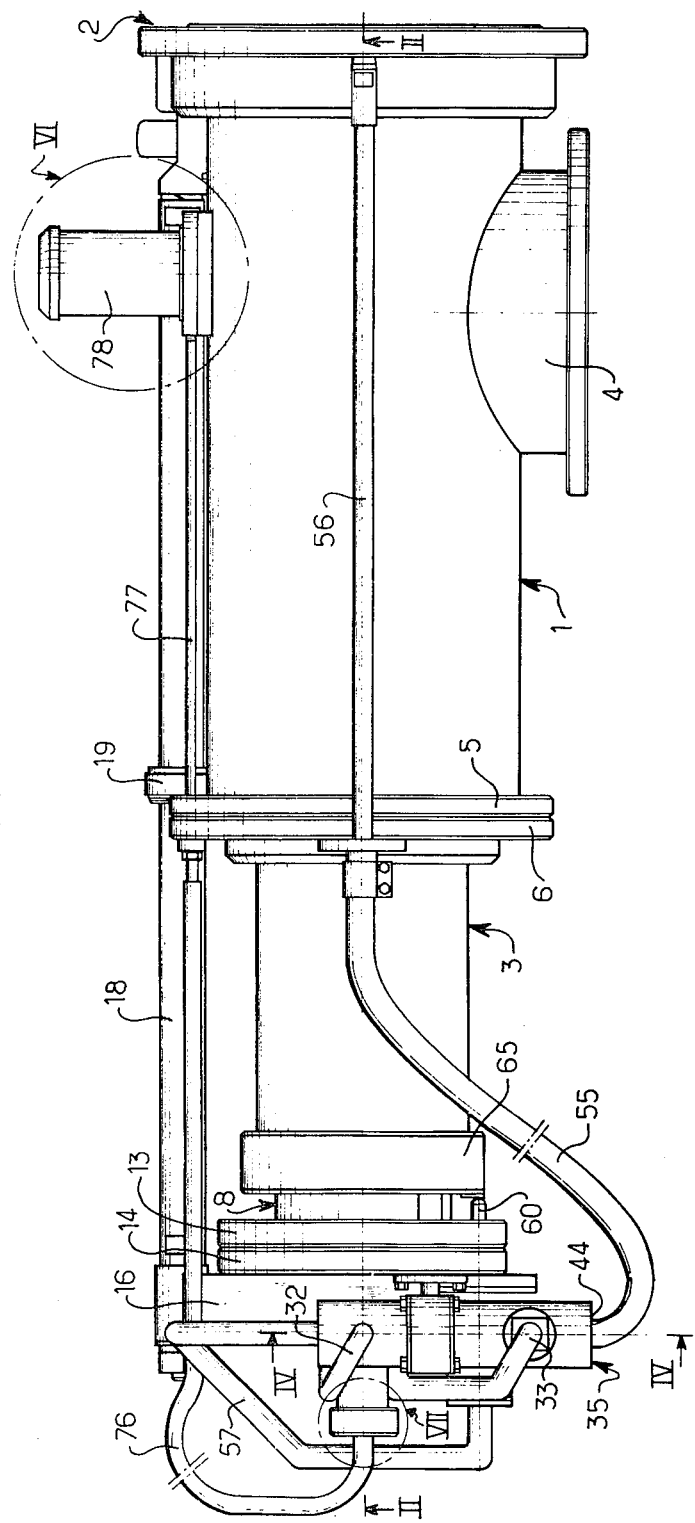
FIG. 1 is a plan view of a first piping element according to the invention, which in this case is the stationary element.
Figure 2:
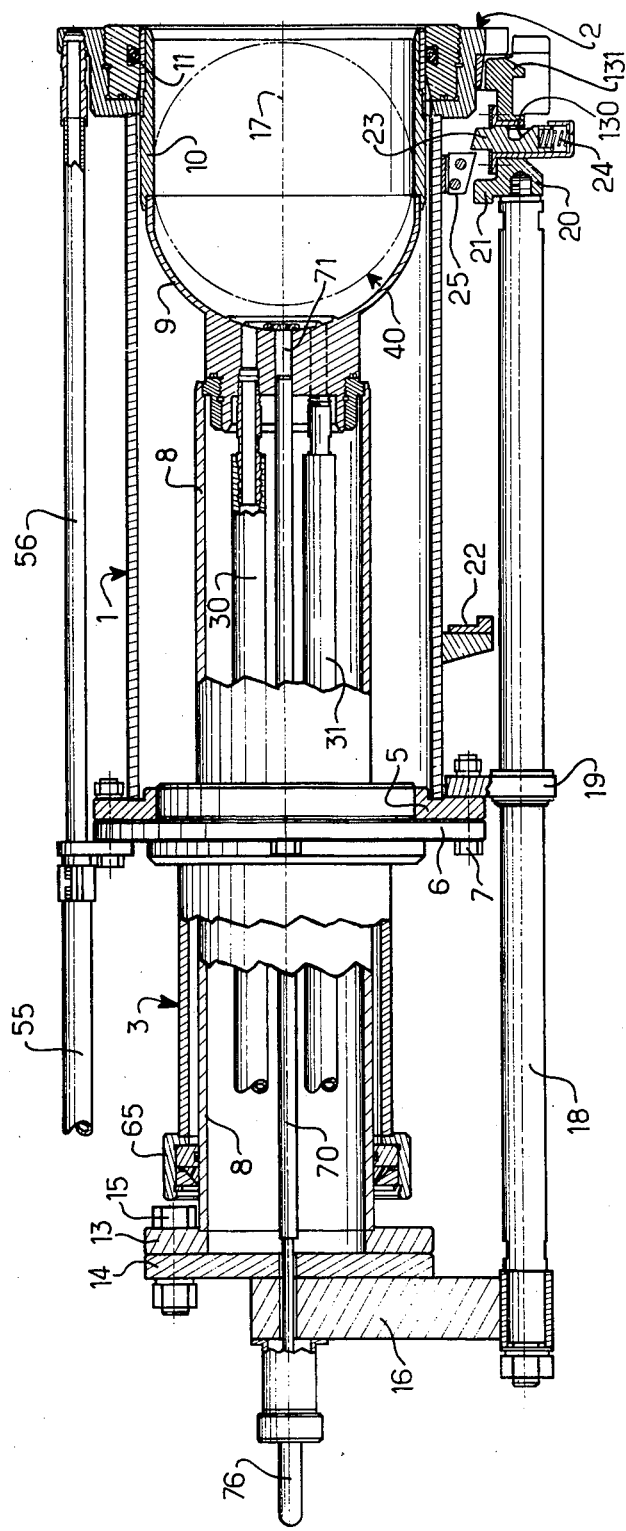
FIG. 2 is a side view of the element shown in FIG. 1, including two partial cross-sections, one in the plane of line II-II of FIG. 1, and the other in a different plane.
Figure 3:
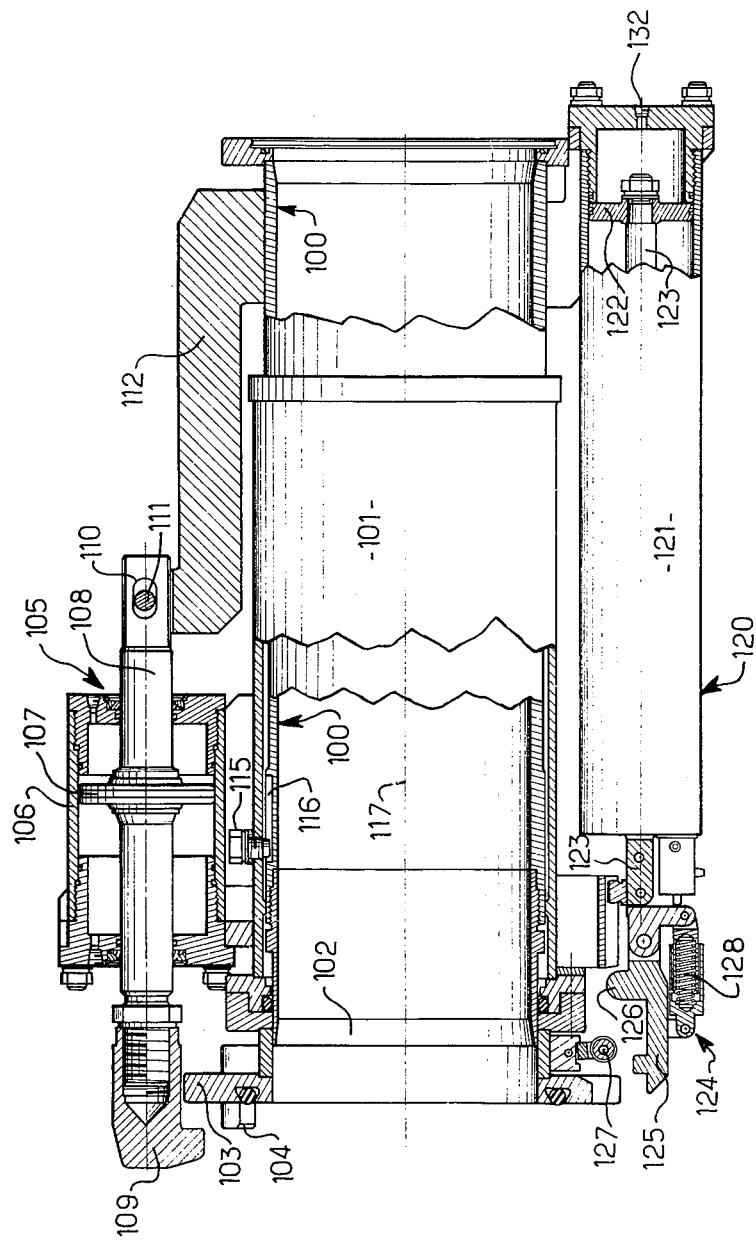
FIG. 3 is a plan view, partially in section, of the second piping element according to the invention, which in this case is the movable element.

The drawings illustrate in FIGS. 1 and 2 a preferably stationary first piping element, and in FIG. 3 a preferably movable second piping element which is adapted to be connected to any one of a series of piping elements such as the one illustrated in FIGS. 1 and 2.

With reference to FIGS. 1 and 2, the first piping element is substantially T-shaped and comprises a first cylindrical conduit 1, forming the bar of the T and provided at one end with a flange 2 for the connection of the first piping element to a second piping element and axially extended at its opposite end by a stationary cylindrical conduit 3. The first piping element also comprises another cylindrical conduit 4, forming the stem of the T and opening perpendicularly into conduit 1 in proximity to the flange 2.

The cylindrical conduits 1 and 3 are fastened together at their corresponding ends by bolts 7 passing through their flanges 5 and 6 and are traversed axially and in fluid-tight relationship by a hollow cylindrical rod 8 which is movable in translation. The rod 8 is fixedly assembled, at its front end located on the flange 2 end of the first piping element, to a piston 9 in the shape of a semi-spherical cup. The concavity of the cup faces the flange 2, and is extended towards the latter by a substantially cylindrical tube section 10 which, in its end position shown in FIG. 2, cooperates with a circular seal 11 provided in the inner cylindrical surface of the flange 2.

The opposite end of the rod 8 is provided with a flange 13 to which is fastened a circular plate 14 by means of bolts 15, said plate closing this end of the rod 8 and carrying a radial arm 16 perpendicular to the common centerline 17 of the cylindrical conduits 1, 3 and the rod 8.

The radially outer end of the arm 16 is fixedly assembled to a rod 18 extending outside the conduits 1 and 3 in parallel relationship to the latter towards and almost as far as the flange 2. The rod 18 is guided in longitudinal translation in parallel relationship to the centerline 17 by means of a bearing 19 carried by the flange 5 of the first conduit 1.

The front end of the rod 18 carries a member 20, which includes a peripheral shoulder 21 intended to co-operate with a stop 22 carried by the first conduit and limiting the rearward displacement of the rod 18, and locking means 23 comprising a transverse push-member urged by a spring 24 towards an abutment 25 which also is carried by the first conduit 1 and is located in proximity to the flange 2. The push-member 23 and the abutment 25 are each provided with an inclined surface allowing the push-member 23 to be shifted laterally against the action of the spring 24 during the return motion of the rod 18 towards the flange 2, after which the push-member 23 is returned to the latching position by the spring 24 after moving past the abutment 25, so that the rod 18 is then locked in longitudinal translation when it occupies the position shown in FIG. 2.

The piston 9 and its cylindrical extension 10, the hollow cylindrical rod 8, the radial arm 16 and the rod 18 constitute means for sealingly obturating the opening of the conduit 4 into the conduit 1 and means for displacing the piston 9 beyond the opening of the conduit 4, thus ensuring a passage between the flange 2 and the conduit 4.

The hollow cylindrical rid 8 contains at least two longitudinal pipes 30 and 31, each of which opens at the concave surface of the piston 9 whereas its other end is connected, through the closing plate 14, to an inlet 32, 33, respectively, of a distributing valve 35 mounted on the plate 14.

The semi-spherical surface of the piston 9 is adapted to receive a ball 40, shown in phantom lines in FIG. 2, which is a means for cleaning the inner surfaces of second piping elements which will be connected to the first piping element. A fluid under pressure may be supplied through the pipe 31 to convey the ball 40 into the second piping elements, whereas the pipe 30 forms a flow path towards a tank (not shown) for the fluid pushed by the ball 40 during its return motion towards the piston 9.

With reference to FIG. 4, the distributing valve 35 comprises two sealingly separated cavities 42, 43, an inlet 44 for fluid under pressure permanently communicating with a cavity 43, the outlet 33 of which is closed or open depending upon the position of a piston 45, which is pushed by a spring 46 to close the outlet 33. The piston 45 is resiliently connected by a spring 47 and a pushmember 48 penetrating into the cavity 42 to an obturating element 49 adapted to close an outlet 50 of the cavity 42 with which the inlet 32 communicates permanently. A spring 51 constantly urges the obturating element 49 in the direction opposite to the closing of the outlet 50.

The aforesaid outlet 33 is also provided with a check-valve constituted by an obturating member 52 and a return spring 53, which prevents the fluid from passing from the pipe 31 into the cavity 43. The supply of fluid under pressure into the inlet 44 takes place through a flexible pipe 55 which extends to the flange 6 of the cylindrical conduit 3, from which it is extended to the flange 2 of the conduit 1 by a rigid pipe 56. This pipe opens on the face of the flange 2, by which the flange 2 is sealingly assembled to the corresponding face of the flange of the second piping element shown in FIG. 3.

The outlet 50 of the cavity 42 of the distributing valve 35 is connected by a pipe 57 to the inlet 58 of a device 59 which also is carried by the plate 14 serving to close the rod 8 and which is shown in more detail in FIG. 5.

Referring to FIG. 5, the device 59 includes an axial pin 60 which sealingly passes through the end of the device 59 opposite the inlet end 58, and is urged by a spring 61 to an extended position outside the device 59. The inner end of the pin 60 carries an obturating member 62 adapted to sealingly close, under the action of the spring 61, an annular passage 63 connecting the cavity into which the inlet 58 opens to an outlet 64 connected by a pipe to a tank. The pin 60 of the device 59 extends in parallel relationship to the centerline of the hollow rod 8 and, in the position shown in FIGS. 1 and 5, meets the end 65 of the conduit 3 opposite the end provided with the flange 6. In this position, the pin 60 is driven into the device 59 against the action of the return spring 61 and ensures a passage for the fluid between the inlet 58 and the outlet 64. Thus, the liquid repelled by the ball 40 and passing through the conduit 30, the cavity 42 of the distributing valve 35 and through the device 59 can flow into a tank when the hollow rod 8 is completely driven into the conduits 1 and 3 as shown in FIGS. 1 and 2.

The plate 14 closing the end of the hollow rod 8 is also traversed, as is the radial arm 16, by a rod 70 whose front end penetrates into an axial cylindrical hole 71 opening at the concave surface of the piston 9 (FIG. 2), and the opposite end of which is fixedly assembled to a piston 72 (FIG. 7) sealingly sliding within a cylinder 73 secured to the radial arm 16. The piston 72 together with the rod 70 are urged by a spring 74 towards the piston 9, whereas the opposite end of the cylinder 73 is provided with an outlet 75 connected to an indicator 78 (FIG. 6) by means of a flexible pipe 76 which, from the flange 6 of the conduit 3, is extended by a rigid pipe 77.

The indicator 78, shown in more detail in FIG. 6, is mounted on the outer surface of the cylindrical conduit 1 of the first piping element and comprises a hollow cylindrical body 79 externally and sealingly surrounded, with a small clearance, by a cylinder 80 of transparent material defining about the body 79 a cylindrical annular space of small width. This annular space communicates through the pipes 77 and 76 with the cylinder 73, so that when the latter are filled with a colored liquid a small movement of the piston 72 results in important variations of the level of the colored liquid in the said annular space between the hollow body 79 and the transparent cylinder 80. A slot 81 in the body 79 connects the internal space of the latter to the said annular space and forms an overflow passage for the colored liquid.

The second piping element intended to be sealingly assembled to the first piping element shown in FIGS. 1 and 2 will now be described with reference to FIG. 3.

This second piping element comprises a rectilinear cylindrical conduit 100 which is co-axially surrounded by a sleeve 101 slidingly mounted about the conduit 100 and which, in the position shown in FIG. 3, extends slightly beyond the front end 102 of the conduit 100. At this end, the sleeve 101 is provided with a flange 103 which forms the connecting flange of the second piping element and the size of which is substantially identical with that of the flange 2 of the first piping element. The periphery of the flange 103 is provided with L-shaped members 104 for centering the two flanges 2 and 103 exactly opposite one another, and provided for this purpose with a longitudinal branch intended to come into contact with the outer peripheral surface of the flange 2 of the first piping element.

On the outer surface of the sleeve 101 are mounted at least two actuators or power cylinders 105 serving to tightly apply the flanges 2 and 103 on one another. The actuators 105 include a cylinder 106 fixedly assembled to the sleeve 101 and a piston 107 carried by a piston rod 108 which sealingly passes through the mutually opposite ends of the cylinder 106. The front end of the rod 108 is extended by a nose, catch or like hook-shaped member 109 adapted to seize the flange 2 of the first piping element, whereas the opposite end of the rod 108 is provided with a longitudinal aperture 110 in which is placed a transverse pin 111 secured to an arm 112 which is itself secured to the conduit 100. It is thus understood that the axial movements of the piston 107 with respect to the conduit 100 is limited by the longitudinal size of the aperture 110.

The actuators 105 are of the double-acting type and are provided with two inlets for a fluid under pressure opening into the cylinder 106 on either side of the piston 107, so as to displace the latter and therefore the piston rod 108 in one direction or the other with respect to the conduit 100. Since the cylinder 106 is fixedly assembled to the sleeve 101 which is itself slidingly and sealingly mounted about the conduit 100, it can readily be understood that the cylinder 106 and the piston 107 will be displaced in opposite directions with respect to the conduit 100.

The longitudinal displacement of each cylinder 106 is limited by means of a screw or the like 115 passing right through the wall of the sleeve 101 and penetrating into a longitudinal slot 116 provided on the outer surface of the conduit 100.

The conduit 100 also carries means 120 for the control of the aforesaid obturating means of the first piping element (which have been described with reference to FIG. 2). The means 120 include essentially an actuator or power cylinder, the cylinder 121 of which is fixedly assembled to the conduit 100 and the piston 122 of which is connected by a longitudinal rod 123 to means 124 allowing the unlocking of the rod 18 when the latter is in the position shown in FIG. 2 and corresponding to the obturation of the first piping element.

The unlocking means 124 include a finger 125 hingedly connected by a transverse pin to the end of the rod 123 and provided with a projecting round surface 126 adapted to co-operate with a roller 127 mounted at the front end of the sleeve 101. A return spring 128 holds the finger 125 in a position aligned with the rod 123. The end portion of the finger 125 is provided with an inclined surface adapted to co-operate with another inclined surface 130 provided on the push-member 23 (FIG. 2), so as to displace the latter against the action of the return spring 24 by means of the finger 125. The push-member 23 is also preceded by a projecting abutment 131 which moves past the finger 125 when it is inclined by compressing the spring 128 when the projecting round surface 126 bears upon the roller 127.

The actuator 121 also is of the double-acting type allowing the piston 122 and the rod 123 to be displaced in parallel relationship to the centerline 117 in both mutually opposite directions.

The devices which have just been described operate as follows.

It will first be observed that the second piping element, which in this case is the movable element, must, in order to be assembled to the first piping element, be displaced in parallel relationship to the plane of the junction surface between the two elements, at least when it is in proximity to the first piping element. This is due to the fact that the piston rods 108 by means of which the two elements are tightly clamped to one another are displaceable only in the longitudinal direction and therefore the noses or catches 109 must pass behind the flange 2 of the first piping element.

Before assembling the two piping elements together, the means of obturation of the first piping element formed by the piston 9 and the hollow rod 8 are in the position shown in FIG. 2, whereas for the second piping element shown in FIG. 3 the piston rods 108 are moved forward as far as possible and the sleeve 101 is telescoped completely onto the conduit 100, the flange 103 thus being substantially at the same level as the end 102 of the conduit 100.

After the two piping elements are placed substantially opposite one another, i.e., when the centerlines 17 and 117 are substantially aligned, the fluid under pressure is supplied into the actuators 105 (which are diametrally opposed) so as to displace the flange 103 of the second piping element towards the flange 2 of the first piping element. During this movement, the alignment of the two flanges 2 and 103 is made perfect by means of the L-shaped members 104 carried by the flange 103, and simultaneously the piston rods 108 have moved in the direction opposite to the movement of the flange 103, thus tightly clamping the flanges 2 and 103 to one another by means of the noses 109.

The two piping elements are thus perfectly aligned and assembled together. In order to allow the loading or unloading of a fluid or a fluidized solid material to take place through the piping elements, the means of obturation of the first piping element must then be operated. To this end, fluid under pressure is supplied into the actuator 120 carried by the second piping element, through the inlet 132 of the said actuator, thus causing the piston rod 122 to move out of the cylinder 121. During this movement, the round surface 126 of the finger 125 meets the roller 127, so that the finger 125 rotates about its hinge pin by compressing the spring 128. This allows it to move past the abutment 131 arranged at the front end of the rod 18, and the inclined end surface of the finger 125 then acts upon the inclined surface 130 of the push-member 23, thus displacing the latter by compressing the spring 24. The bar 18 is then unlocked from the abutment 25. The movement of the piston rod 123 continues, thus driving the rod 18 away from the abutting flanges 2 and 103, until the peripheral shoulder 21 of the rod 18 meets the abutment 22 carried by the conduit 1 of the first piping element. The movement of the bar 18 has driven hollow rod 8 in a parallel direction and also the semi-spherical piston 9, so that the opening of the conduit 4 into the conduit 1 is freed, and the material to be loaded or unloaded can pass from one piping element into the other. When the loading or unloading operation is completed, a cleaning of the second piping element and the elements following it is performed in the following manner.

The piston 9 is returned to its obturating position shown in FIG. 2 by supplying the actuator 120 with pressure through its opposite end, thus retracting the piston rod 123 into the cylinder 121. The finger 125 of this piston rod comprises, as shown in FIG. 3, a projecting portion which catches the abutment 131 during the retraction of the piston rod 123, whereas the inclined end of the finger 125 disengages the push-member 23 which then occupies the position shown in FIG. 2. The retraction of the piston rod 123 and the consequent movement of the rod 18 towards the flange 2 continue until the inclined surface at the upper end of the push-member 23 contacts the inclined surface of the abutment 25 and finally moves past the latter, the finger 125 being simultaneously freed from the abutment 131 when the round surface 126 again contacts the roller 127. The uncoupling of the finger 125 and of the abutment 131 allows complete retraction of the piston rod 123 into the cylinder 121 (position shown in FIG. 3). A fluid under pressure is then supplied into the pipe 56 by means of a conduit, not shown in FIG. 3, located on the second piping element side and which passes through the thickness of the flange 103 and opens exactly opposite the opening of the pipe 56 in the flange 2 of the first piping element. By this means, the inlet 44 of the distributing valve 35 is supplied with fluid under pressure, thus (as can be seen from FIG. 4) compressing the springs 46 and 47, closing the opposite outlet 50 of the distributing valve 35 and opening the passage towards the outlet 33, thereby supplying fluid under pressure through the conduit 31 (FIG. 2) onto the concave internal surface of the piston 9. The ball 40 resting against this surface is thus vigorously ejected into the second piping element and through any following piping elements, as far as the end of the loading and unloading pipeline. The ball 40, having substantially the same diameter as the inner diameter of the piping elements, scrapes and cleans the internal surface of the latter. When the ball 40 reaches the end of the pipeline the supply of fluid under pressure to the inlet 44 of the distributing valve 35 is stopped, and the ball 40 is then returned towards the first piping element. To accomplish this, outlet 33 of the distributing valve 35 is closed by the piston 45, thereby opening the passage between the inlet 30 and the outlet 50. The liquid or material being pushed by the ball 40 when the latter is returning towards the piston 9 flows through the conduit 30, the cavity 42 of the distributing valve 35 and the pipe 57 towards the device 59. The inwardly repelled pin 60 of the latter has opened the passage between the inlet 58 and the outlet 64 and the repelled liquid can thus flow into a tank.

The two piping elements, once cleaned, can then be disassembled from one another by reversing the supply of fluid under pressure to the actuators 105. The piston rods 108 are then pushed towards the first piping element, whereas the flange 103 is displaced in the opposite direction, thus withdrawing from the flange 2.

It is therefore readily understood that the devices just described allow the two piping elements to be reliably and quickly, advantageously automatically or semi-automatically assembled to one another, while at the same time enabling at least one of the piping elements to be selectively obturated and the other piping element to be cleaned.

What is claimed is:

1. Safety connection apparatus for coupling two piping elements together, the apparatus including a first piping element having a first cylindrical conduit with a front end and a rear end, a first connecting means at the front end of the first conduit, and a second conduit opening into the first conduit; a second cylindrical piping element having a second connecting means at one end adapted to sealingly assemble to the first connecting means; means for sealingly assemblying the second connecting means coaxially to the first connecting means; obdurating means mounted in one of the piping elements; and control means operable for moving the obdurating means selectively to open and shut a passage in said one element, wherein the improvement comprises:
    said obdurating means being mounted in the first piping element and comprising a slidably movable piston having a front end and a rear end, the piston sealingly engaging the interior surface of the first cylindrical conduit;
    said control means being mounted on the second piping element; and
    operating means attached to the rear of the obdurating piston and extending through the rear end of the first cylindrical conduit, the control means being adapted to engage the operating means externally of the first piping element for moving the obdurating means in the first conduit selectively from an obdurating position in front of the opening of the second conduit to an open position to the rear of the opening of the second conduit when the two piping elements are assembled together.

2. Apparatus according to claim 1 wherein the control means comprises a double-acting actuator having a cylinder fixedly assembled to the second piping element parallel to the axis thereof, an actuator piston movable in the cylinder, and a piston rod parallel to said axis, the piston rod having an end fixed to the actuator piston and extending sealingly through one end of the cylinder to an opposite free end adapted to engage the operating means when the two piping elements are assembled together.

3. Apparatus according to claim 2 wherein the operating means comprises:
    a first cylindrical rod having one end fixedly assembled to the other end of the obdurating piston, the rod extending sealingly through the rear end of the first cylindrical conduit to terminate in an opposite free end;
    a second rod slidably mounted on the outside of the first cylindrical conduit parallel to the first cylindrical rod, the second rod having a rear end fixedly assembled to the free end of the first cylindrical rod and a front end extending to adjacent the first connecting means when the obdurating piston is in the obdurating position.

4. Apparatus according to claim 3 comprising:
    a front abutment mounted on the first cylindrical conduit adjacent to the first connecting means;
    a rear abutment mounted on the first cylindrical conduit to the rear of and spaced from the front abutment, the second rod being guided for axial displacement between first and second positions limited by the two abutments and corresponding, respectively, to the obdurating and open positions of the obdurating piston; and
    means for locking the second rod in the first position.

5. Apparatus according to claim 4 wherein the means for locking the second rod in the first position comprises:
    said front abutment and
    a push-member on the front end of the second rod, the push-member having a resilient return means, and the front abutment having an inclined surface adapted to cooperate with the resilient return means to lock the rod in the first position.

6. Apparatus according to claim 4 comprising means mounted on the free end of the piston rod of the control means for unlocking the locking means and for engaging the front end of the second rod to displace the same toward the rear abutment in response to the selective introduction of fluid under pressure into the cylinder of the control means between the actuator piston and the other end of said cylinder when the two piping elements are assembled together so as to move the obdurating piston to the open position.

7. Apparatus according to claim 1 wherein the first and second connecting means comprise first and second flanges, respectively, and the means for sealingly assembling the second connecting means coaxially to the first connecting means comprises:
    at least two double-acting actuators, each actuator having a cylinder, means for mounting the cylinder on the second piping element parallel to the axis thereof, a piston reciprocally positioned in the cylinder, a piston rod attached to the piston, the piston rod extending sealingly through one end of the cylinder toward the one end of the second piping element to a free end, and means mounted on the free end of the piston rod and extending beyond the second flange, said means being adapted to seize the first flange of the first piping element and to clamp the first flange against the second flange in response to the selective introduction of fluid under pressure into the actuator cylinder between the piston and the one end thereof.

8. Apparatus according to claim 7 wherein the means for mounting each actuator cylinder of the assembling means on the second piping element comprises a cylindrical sleeve slidably mounted on the second piping element and having the second flange mounted on one end thereof, the actuator cylinders being fixedly assembled onto said cylindrical sleeve.

9. Apparatus according to claim 8 comprising at least two arms fixedly assembled to the second piping element, each arm extending adjacent to the piston rod of a corresponding one of the actuators; a pin fixedly attached to one of each arm and the corresponding piston rod; and a longitudinal slot of a predetermined length in the other of the arm and the piston rod; the pin extending into the slot, whereby the longitudinal displacement of the piston rod with respect to the second piping element is limited by the longitudinal dimension of said slot.

10. Apparatus according to claim 8 comprising two longitudinally spaced abutments attached to one of the second piping element and the cylindrical sleeve and a stop member attached to the other of the second piping element and the cylindrical sleeve in engaging relation to said abutments, whereby the sliding displacement of the sleeve with respect to the second piping element is limited by the spacing between the abutments, the spacing being predetermined to define a sealingly assembled position and a disassembled position of the two piping elements.

11. Apparatus according to claim 7 wherein the means for seizing the first flange comprises a hook-shaped element mounted on the free end of each piston rod, and the second piping element is movable with respect to the first piping element in a plane parallel to the face of the first flange for enabling the hook-shaped element to pass behind the first flange.

12. Apparatus according to claim 1 wherein the first and second piping elements comprise first and second flanges, respectively, and elements projecting from the face plane of one of said flanges for bringing the other of said flanges into coaxial alignment therewith when the two piping elements are assembled together.

13. Apparatus according to claim 1 wherein the obdurating piston comprises a semi-spherical cup at the front end thereof, the concavity of said cup opening toward the front end of the first cylindrical conduit and being adapted to receive a ball having a diameter substantially equal to the inner diameter of the second piping element, the ball being usable for cleaning the inner surface of the second piping element.

14. Apparatus according to claim 1 wherein the cylindrical rod attached to the obdurating piston is provided with passages from the supply and return of a fluid under pressure, said passages extending through to the concave surface of the semi-spherical cup on the one end of the obdurating piston for permitting a ball to be expelled from and returned to said cup.

15. Apparatus according to claim 14 comprising at least one distribution slide valve connected to the passages in said cylindrical rod for selectively supplying fluid under pressure to the supply passage for pushing a ball from the cup into the second piping element and withdrawing fluid from the return passage for allowing the return of the ball to the cup when the two piping elements are assembled together.

16. Apparatus according to claim 15 comprising a circuit for supplying fluid under pressure to the at least one distributing slide valve only when the two piping elements are sealingly assembled together.

* * * * *